US006535832B2

(12) United States Patent
Page et al.

(10) Patent No.: US 6,535,832 B2
(45) Date of Patent: Mar. 18, 2003

(54) DYNAMIC TEST FIXTURE FOR A VEHICLE EXHAUST SYSTEM CAPABLE OF TWELVE DOF

(75) Inventors: Arthur J. Page, Canton, MI (US); Bruce Howard Whittle, Livonia, MI (US); James Alanoly, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 69 days.

(21) Appl. No.: 09/734,908

(22) Filed: Dec. 13, 2000

(65) Prior Publication Data

US 2001/0002459 A1 May 31, 2001

Related U.S. Application Data

(63) Continuation-in-part of application No. 09/253,707, filed on Feb. 22, 1999, now Pat. No. 6,304,829.

(51) Int. Cl.$^7$ ............................................. G06F 15/00
(52) U.S. Cl. ..................... 702/141; 702/113; 701/108
(58) Field of Search .................... 364/508; 60/274; 701/29, 108; 702/141, 113; 180/89.2, 309, 296, 225

(56) References Cited

U.S. PATENT DOCUMENTS

| | | |
|---|---|---|
| 3,718,033 A | 2/1973 | Peterson |
| 3,827,289 A | 8/1974 | Borg |
| 4,011,749 A | 3/1977 | Cappel |
| 4,164,152 A | 8/1979 | Lemonde et al. |

(List continued on next page.)

FOREIGN PATENT DOCUMENTS

DE  3515010 C2  2/1987
EP  0 199 317 B1  4/1986

OTHER PUBLICATIONS

Steven R. Haeg, P.E., Techniques for laboratory Durability Testing of Exhaust Systems Nov. 1997, IATO All page pertinent.*
Team Corporation Web Page published Bulletins, "Automotive Vibration Test System"; "Engine Simulation Systems"; "Four Poster Test Systems"; "The CUBE 6 Degrees of Control"; "Team Corporation Introduces The CUBE™ Six Degree of Control™ Vibration Test System"; and "Team Delivers Flexible 'Four Post' Test System"; May 20, 1998, 9 pp.
Iato Paper, "Techniques For Laboratory Durability Testing Of Exhaust Systems", Steven R. Haeg, P.E., published Nov/ 1997 (SAE Indonesia), 6 pp.

*Primary Examiner*—John Barlow
*Assistant Examiner*—Aditya Bhat

(57) ABSTRACT

A vehicle exhaust system test fixture integrates separate dynamic controls to provide at least twelve degrees of freedom (DOF). In one embodiment, two separate test tables are integrated so that one of the tables supports mounting of an engine/powertrain or apparatus simulating the engine/ powertrain when coupled to an exhaust system. The other table supports mounting of the exhaust system to be tested. Each table is linked to a set of actuators/accelerometers to control motion up to 6 DOF. The capability of twelve DOF allows the test fixture to accurately reproduce both the dynamic behavior of a vehicle engine/powertrain during operation, and the dynamic behavior of the vehicle chassis during operation in the area where the exhaust system is attached to the vehicle frame. In addition, generated thermal profiles and high frequency external vibrations can be applied to allow simulation of real-world vibrations, and thermal stresses caused by hot exhaust gases. Another embodiment provides 12 DOF with a single test table rig arrangement. Yet another embodiment provides for greater than 12 DOF.

18 Claims, 7 Drawing Sheets

U.S. PATENT DOCUMENTS

| | | |
|---|---|---|
| 4,181,028 A | 1/1980 | Talbott, Jr. |
| 4,181,029 A | 1/1980 | Talbott, Jr. |
| 4,498,343 A | 2/1985 | Kimball |
| 4,658,656 A | 4/1987 | Haeg |
| 4,875,374 A | 10/1989 | Pinson |
| 5,343,752 A | 9/1994 | Woyski et al. |
| 5,572,440 A * | 11/1996 | Harashima et al. .......... 364/508 |
| 5,610,330 A | 3/1997 | Fricke et al. |
| 5,675,505 A | 10/1997 | Trimboli |
| 5,901,553 A * | 5/1999 | Cullen .......................... 60/274 |
| 6,085,132 A * | 7/2000 | Ishii et al. ..................... 701/29 |

* cited by examiner

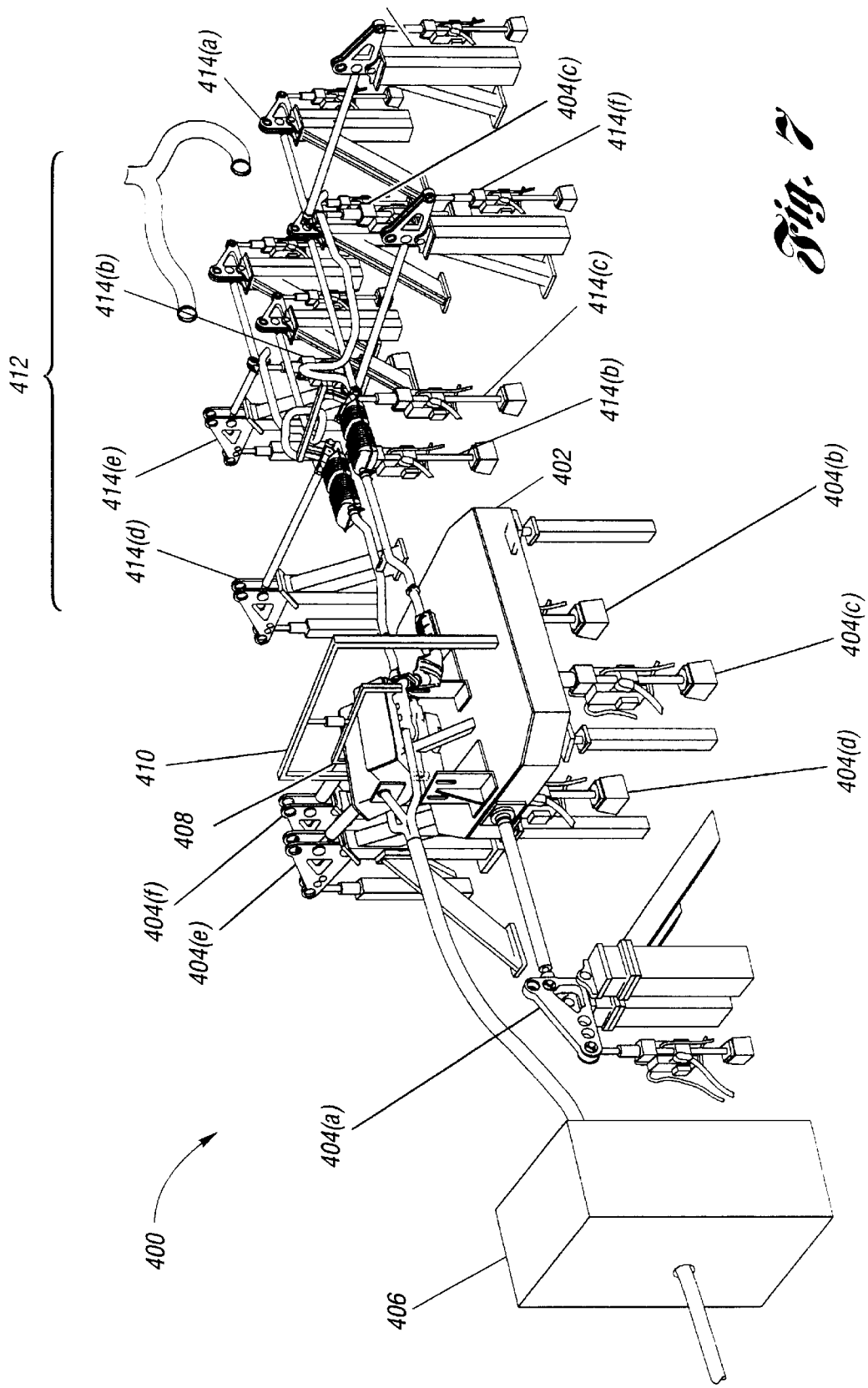

DYNAMIC TEST FIXTURE FOR A VEHICLE EXHAUST SYSTEM CAPABLE OF TWELVE DOF

CROSS-REFERENCE TO RELATED APPLICATION

This application is a continuation-in-part of U.S. application Ser. No. 09/253,707, filed Feb. 22, 1999 now U.S. Pat. No. 6,304,829.

TECHNICAL FIELD

The present invention generally relates to vehicle test fixtures which simulate vibrational effects of road conditions and, more specifically, to an improved dynamic test fixture suitable for testing a vehicle exhaust system with twelve degrees of freedom (DOF).

BACKGROUND ART

Generally, a vehicle exhaust system must perform several demanding and diverse requirements, i.e., attenuating engine noise while porting and reducing emission levels of engine exhaust gas to the atmosphere. In addition, legislative action in combination with typical market driven design concerns have made the need for durable exhaust systems greater than ever before.

Thus, the need for determining exhaust system durability in a cost effective manner has generated demand for a system capable of verifying complete system performance prior to integration with a vehicle. Due to reduced product cycle time, physical testing of system level hardware and durability has been used to validate computer aided engineering (CAE) analysis. However, the analytical methods of determining durability to date have not proven completely accurate. Thus, physical test fixtures are typically used in an attempt to simulate actual road conditions for measuring system durability.

However, the problem with using physical test fixtures is that the demonstrated reliability and failure mode/mechanisms of the test results is directly related to the realism with which the input control signals/boundary conditions simulate actual road conditions. While the structural materials of the exhaust system have generally predictable responses, other factors such as exhaust hanger isolations are nonlinear or not well defined but will greatly influence the exhaust system dynamic loads, accelerations, and displacements. In addition, to date, available test fixtures have not been capable of supporting control signals for testing an exhaust system up to 12 DOF. With a higher DOF, test conditions and control signals can be made more realistic and reliable. As a result, a need exists for an improved test fixture capable of providing up to 12 DOF to work in conjunction with an arrangement for defining control signals and boundary conditions of 12 DOF for application to the test fixture.

DISCLOSURE OF THE INVENTION

It is, therefore, an object of the present invention to provide a test fixture for testing a vehicle exhaust system that is capable of up to at least 12 DOFs of motion.

In accordance with this and other objects, the present invention provides an exhaust system test fixture capable of at least twelve degrees of freedom including a first test fixture table arranged to mechanically support a vehicle engine and powertrain simulation apparatus, and a first set of actuators arranged to control motion of the first test fixture table in six degrees of freedom. A second test fixture table is arranged to mechanically support a vehicle exhaust system while connected to the engine and powertrain simulation apparatus supported on the first test fixture table, and a second set of actuators are arranged to control motion of the second test fixture table in six degrees of freedom. A controller is connected to the first and second set of actuators for generating actuator control signals to control movement of both test fixture tables based on determined boundary conditions.

In accordance with one aspect of the present invention, determination of the boundary conditions includes determining the number of degrees of freedom (DOF) from 1 to 6 needed to control each of the engine/powertrain and chassis relative to the tested exhaust system. The actuator control signals are determined based on the determined boundary conditions in combination with a first control model arranged to control engine/powertrain motion relative to a test floor, and a second control model arranged to control powertrain motion relative to the first test table if the test fixture is to be operated in a powertrain frame attached mode.

In further accordance with the present invention, an exhaust system test fixture capable of at least twelve degrees of freedom is provided having a test fixture table arranged to mechanically support a vehicle engine and powertrain simulation apparatus, a first set of actuators arranged to control motion of the test fixture table in six degrees of freedom, and a support fixture directly connected to one of the engine and exhaust system. A second set of actuators are connected to the support fixture to control motion in at least six degrees of freedom. A controller is connected to the first and second set of actuators for generating actuator control signals to control movement of the test fixture table and support fixture based on determined boundary conditions. In accordance with one aspect, a single table test fixture arrangement is provided such that the support fixture is connected to the engine, and comprises a frame positioned on top of the test fixture table and connected to the engine via the second set of actuators. In accordance with another aspect, a direct attachment test fixture arrangement is provided such that the support fixture is connected to the exhaust system at each hanger point and is arranged to connect the second set of actuators to the exhaust system at the hanger points.

Thus, the present invention provides an exhaust system test fixture capable of imparting motion that will reproduce the dynamic behavior of the vehicle engine/powertrain during operation in conjunction with reproducing the dynamic behavior of the vehicle chassis during operation in the area where the exhaust system is attached to the vehicle chassis.

The above object and other objects, features and advantages of the present invention are more readily understood from a review of the attached drawings and the accompanying specification and claims.

BRIEF DESCRIPTION OF THE DRAWINGS

FIG. 7 is an elevated perspective view of a flexible body direct attachment exhaust system laboratory test fixture arrangement in accordance with a third embodiment of the present invention.

BEST MODES FOR CARRYING OUT THE INVENTION

Figure 1:
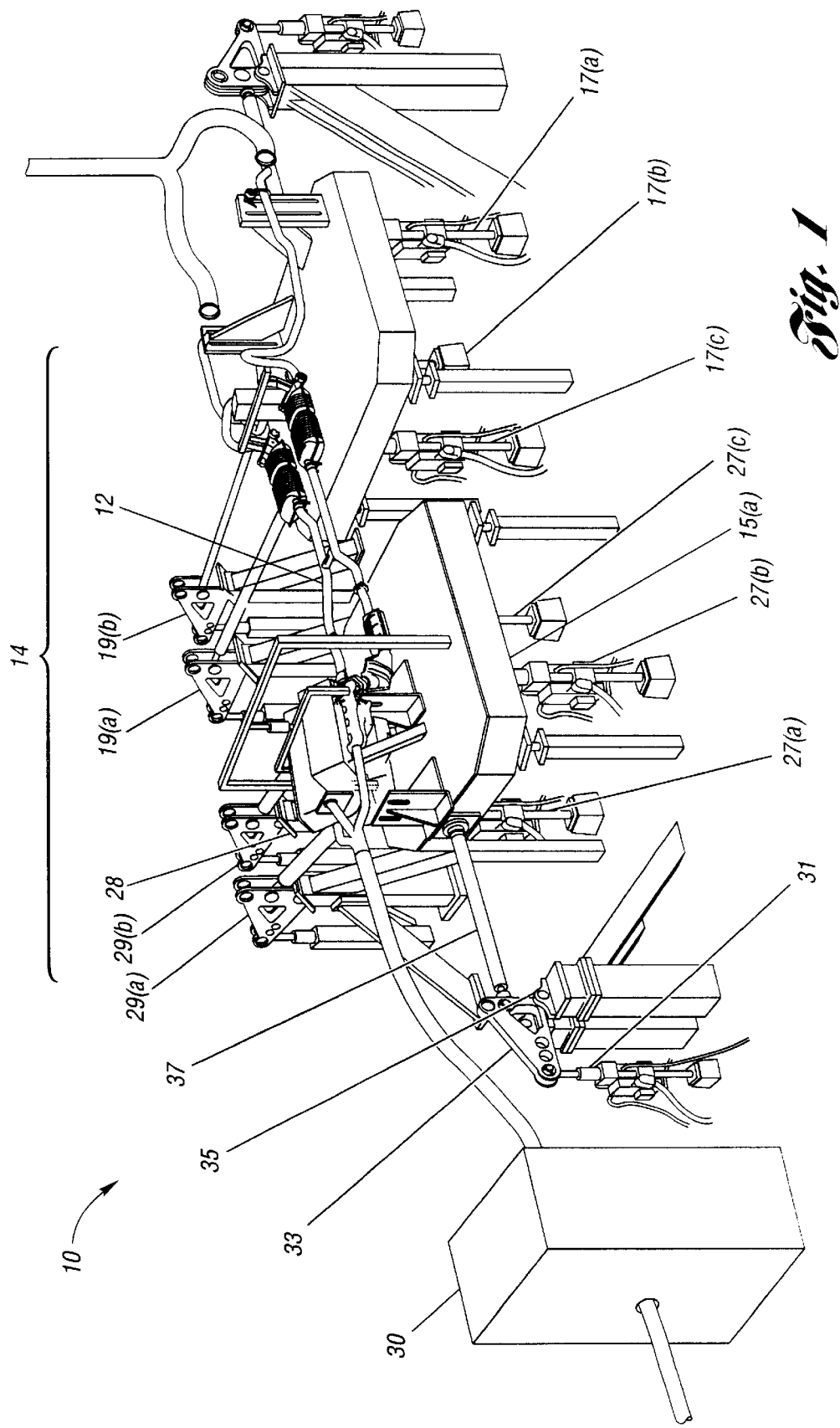
FIG. 1 is an elevated perspective view of a dual table 12 DOF exhaust system laboratory test fixture arrangement in accordance with the present invention.

Referring first to FIG. 1, a first embodiment of the present invention provides a dual table, 12 degrees-of-freedom (DOF) laboratory test fixture arrangement 10 arranged to provide simulated testing of the durability of a vehicle exhaust system 12. The test fixture is represented in block form in FIG. 2. In the embodiment shown in FIG. 1, the test fixture arrangement includes a test rig 14 formed from two separate tables 15(a) and (b) linked to operate together to provide a minimum of 12 DOF. Table 15(a) provides a support for powertrain coupling/simulation, and table 15(b) provides a support for vehicle exhaust system and chassis coupling/simulation as described below.

The test rig is dimensioned so that exhaust system hanger points and/or powertrain may be supported. Each of the tables 15(a) and (b) is formed from a multipurpose, flat simulation table that can be moved in a spatial motion having between 1 to 6 DOF motion. Thus, each table is provided with up to 6 DOF, thereby allowing the present invention to produce a test rig capable of 12 DOF. The tables are linked to operate together in accordance with the control algorithm described below.

The motion of the table supporting the engine/powertrain, i.e., table 15(a), can be controlled using an active engine motion control, or a passive engine control/inertial reacted engine motion strategy. Active engine motion control strategy is achieved by removing the engine/transmission mounts rigidly attaching the engine to the table and moving the table up to 6 DOF motion using engine/displacement control. Passive engine motion control does not remove the engine/transmission mounts, and controls acceleration/displacement as an input. Only DOFs for engine roll, yaw, or pitch are actively controlled.

In the active engine motion control strategy, a first set 26 of six hydraulic actuators are attached to the engine, and in the passive engine control strategy, the set of six actuators are attached to the chassis/table. The first set of actuators are arranged to effect displacement of a powertrain 28 when the test rig is operated in a first "powertrain-frame attached" mode of operation. As discussed below, the test rig can be operated in an alternative "powertrain-frame detached" mode of operation.

The six actuators in set 26 include three actuators 27(a)–(c) to effect displacement in the vertical direction, two actuators 29(a) and (b) to control motion in the lateral direction, and an actuator 31 to control motion in the longitudinal direction.

Table 15(b) is coupled to a second set 16 of hydraulic actuators. The second set of actuators are arranged to effect displacement about 6 DOF of a point on the vehicle chassis. Like the first set of actuators, set 16 includes three actuators 17(a)–(c) to control vertical (translational), pitch, and roll (rotational) motion, two lateral actuators 19(a) and (b) to control lateral (translational) and yaw (rotational) motions, and a longitudinal actuator 21 to control longitudinal (translational) motion. Both sets of actuators operate to transfer mechanical forces to test rig 14 and/or powertrain 28 so as to simulate road induced dynamic motions on a vehicle frame.

Exhaust system 12 and powertrain 28 are attached to test rig 14 in the same manner as would be used for actual in-vehicle installation. Alternatively, instead of mounting an actual engine/powertrain 28 to the test rig, an engine simulating element, e.g., a "cube", can be mounted in its place. The cube is preferably arranged with geometry coordinates suitable for properly positioning the exhaust manifold of the attached exhaust system. The cube can be low in mass, and made of a stiff material. The exhaust manifold(s) are preferably insulated from the cube to minimize thermal inertia.

Figure 2:
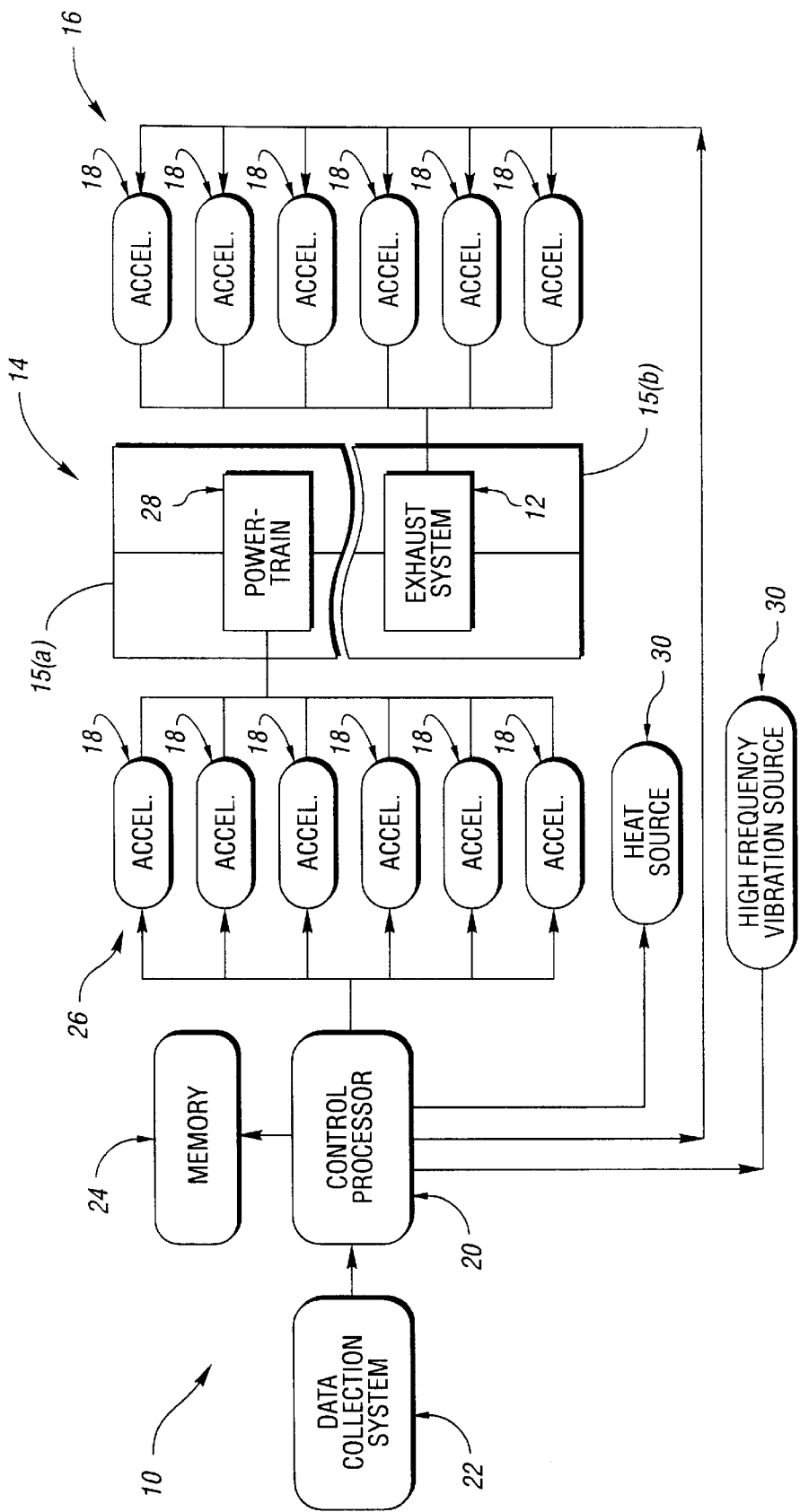
FIG. 2 is a block diagram representation of the dual table 12 DOF exhaust system laboratory test fixture arrangement of the present invention.

As further shown in FIGS. 1 and 2, a suitable high frequency vibration source 38 can be externally coupled to the exhaust manifold outlet ports to simulate the effects of inherent engine unbalance. The input vibration spectrum is generated based on vehicle engine specific profiles.

The vibration source can be implemented as an exciter configured to drive single or dual manifold outlet systems. For example, in the embodiment illustrated in FIG. 1, the exciter is formed as a mechanical bridge attached to the engine or cube apparatus. The bridge moves relative to the engine or cube. At the manifold attachment point, motion is allowed in a plane representing the direction of the excitation force imposed by an engine onto the exhaust system during operation of a vehicle.

Alternatively, the base of the exciter can be attached to the manifold section and unsupported at the opposite end. A payload of mass "m" is attached to the exciter such that a specific acceleration profile produces a forcing function "F" of amplitude and spectrum content proportionally equal to the inherent unbalance forcing function of the engine when in use.

As noted above, actuators 26 are utilized to simulate powertrain acceleration/displacement only when the test fixture is utilized in a powertrain-frame attached mode of simulation. In other words, the hydraulic actuators that control the powertrain are coupled to or react against the chassis portion of the test frame in accordance with the control arrangement described below. In effect, the absolute motion of the supporting frame of the powertrain hydraulic actuators move as a rigid body relative to the chassis frame, while the motion of the powertrain is independent relative to the motion of the chassis frame and is controlled solely by the input drive control signal.

In contrast, in the powertrain frame detached mode of operation, the powertrain is effectively "decoupled" from the chassis portion of the test fixture. This mode represents the exhaust boundary conditions that are specific only to the chassis and not on the powertrain. Thus, input dynamics, i.e., inertial reaction forces, produced by the powertrain will not react with the chassis frame. This obviates production of undesirable modal responses in the operational control range of the chassis frame. This mode of operation is appropriate when a vehicle does not completely behave as a rigid body.

Therefore, the present invention allows tables 15(a) and (b) to be controlled to move as a single rigid body if the vehicle behaves as a single rigid body, or differently if the chassis does not behave as a rigid body. Thus, system flexibility is enhanced because the test rig can be configured to operate as a single rigid body system in either an active or passive mode, or a mechanically decoupled system operated in either a passive or active engine control mode for a rigid or nonrigid body.

Each actuator 16 and 26 includes an accelerometer 18, or other suitable mechanism for causing displacement, and is arranged to receive control and boundary signals from a real time simulation control processor 20 shown in the block diagram of FIG. 2. The actuators are attached to the test rig, engine/powertrain or exhaust system by a suitable bell crank 33, bell crank pivot 35, and link (such as spherical or ball) 37 assembly. The respective bell cranks and links are preferably arranged to be adjustable.

The control and boundary signals drive the respective accelerometers to impart the desired forces onto test fixture 14. The drive file or command signals to the actuators can be in the form of time phased matched accelerations or displacements in a predetermined direction to create "modes" of input for vertical, lateral, and longitudinal directions, as well as translational and rotational directions of pitch, roll, and yaw.

System 10 further includes a device 30 for applying heat to the exhaust system 12, such as by porting/connection to the manifolds as shown in FIG. 1. Heating device 30 would be arranged to be responsive to control signals so as to dynamically emulate the thermal stresses produced when hot exhaust gas passes through the exhaust system.

Control system 20 is arranged in accordance with the present invention to define engine attachment control boundary conditions and control signals for controlling the respective accelerometers and actuators of the test fixture to reproduce both the dynamic behavior of a vehicle's powertrain during operation, and the dynamic behavior of the vehicle frame during operation in an area where the exhaust system is attached to the vehicle frame.

In accordance with another aspect of the present invention, hot exhaust thermal profiles are determined as part of the control process to generate heating control signals which emulate the real world dynamic thermal stresses caused by hot exhaust gases flowing through the exhaust system. Both of these aspects are described more fully below.

Control processor 20 includes suitable programming to produce the desired responses and drive files to derive these thermal profiles, and boundary and control signals based on actual road data collected by a suitable data collection subsystem 22. The derived thermal profiles and boundary and control signals are stored in a suitable memory arrangement 24.

Figure 3:
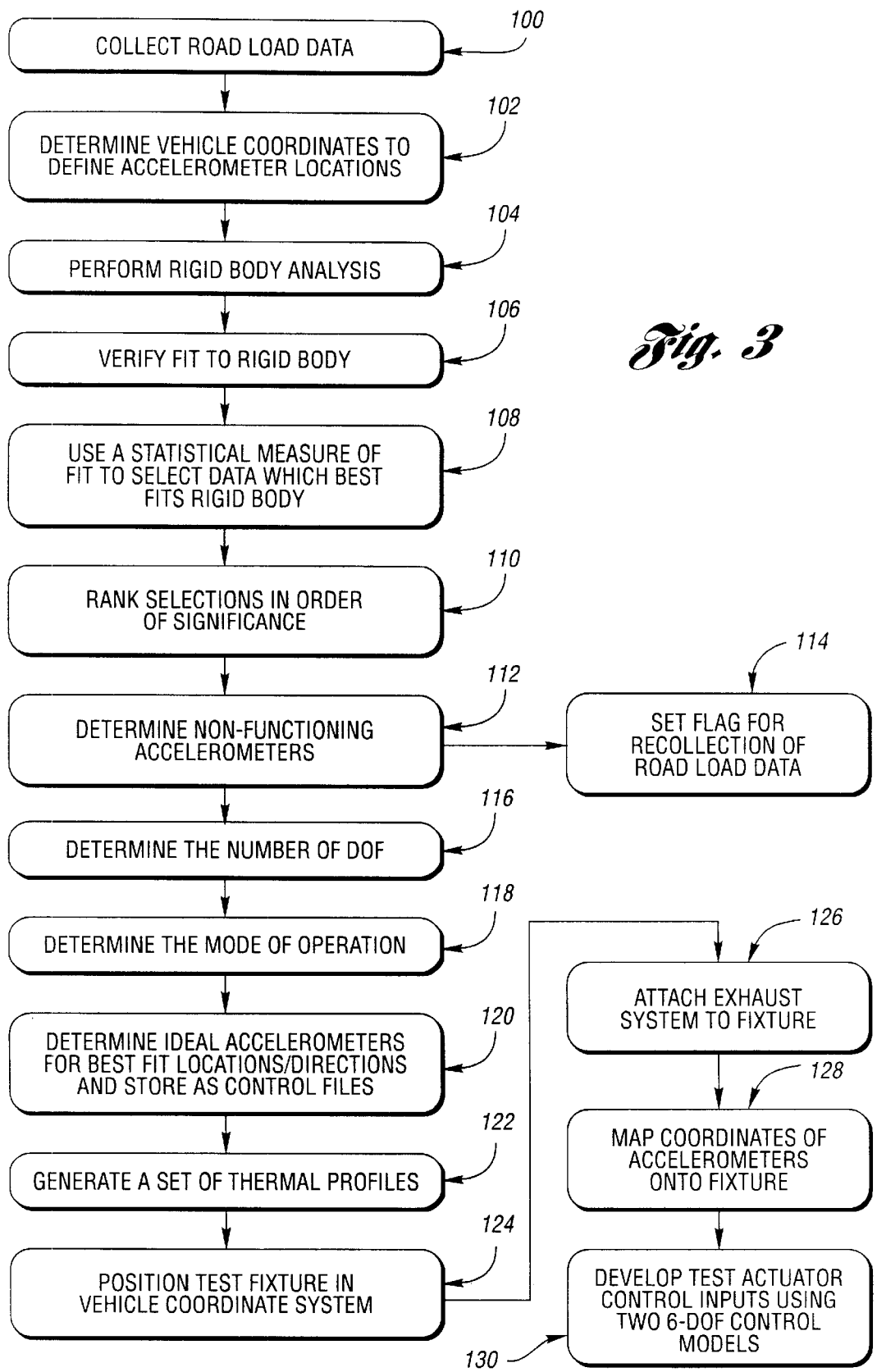
FIG. 3 is a flowchart illustrating the overall process for defining engine and chassis attachment control boundary conditions and appropriate control signals for the test fixture in accordance with a first embodiment of the present invention.

The overall process for defining the engine attachment control boundary conditions, hot exhaust thermal profiles, and appropriate control signals in accordance with the present invention will now be described in context with the flowchart shown in FIG. 3. More specifically, as denoted at block 100, appropriate acceleration road load data is generated in accordance with a first embodiment by collecting during vehicle operation acceleration road load data in the vertical, lateral and longitudinal directions along a vehicle frame rail, including at each of the locations where the exhaust system attaches to the vehicle frame. In a preferred embodiment, approximately 80 channels of data are collected. In addition, relative displacement or absolute acceleration data is simultaneously collected for the powertrain that will define its six degrees of freedom (6-DOF) rigid body motion with respect to the local vehicle frame. This data is representative of the mechanical forces encountered by the exhaust system during use of the vehicle.

In further accordance with the present invention, realism of the testing process can be increased by further simulating the thermal stresses placed on the exhaust system as a result of hot exhaust gas passing through the system. Thus, in addition to collecting mechanical road load data, data is also collected at block 100 which is representative of temperatures and thermal cycling produced throughout the exhaust system during operation of the vehicle.

In an alternative embodiment, data can be collected for the powertrain that will define absolute 6-DOF rigid body motion, such as point acceleration data.

Then, at block 102 the vehicle coordinates of the accelerometer locations are obtained by referencing vehicle frame drawings and/or an actual vehicle to identify the vehicle coordinates that define the locations of the accelerometers used to collect the acceleration road load data of block 100.

At block 104, rigid body analysis is performed by applying the acceleration data and coordinates that define the locations of each of the accelerometers on the vehicle frame in a statistical multiple linear regression analysis to define a rigid body that fits the road load acceleration data at the identified coordinates. The fit of the defined rigid body is then verified for accuracy as denoted at block 106. This process is described in more detail below in connection with FIG. 5.

As denoted by blocks 108–114, the results of the rigid body analysis are then used to derive or select the appropriate control channels for the boundary conditions on the test fixture. More specifically, in a preferred embodiment, a statistical measure of fit is used to select acceleration data at block 108 to define the locations and directions that best fit the defined rigid body. One example of a suitable statistical measure for fit is the correction coefficient of multiple determination ($R^2$) which is defined as:

$$R^2 = SS_R \div SS_T,$$

where:

SS is the sum of squares;

R are residuals; and

T are the total.

These selections are then ranked in order of significance at block 110. The top six locations and directions are selected in the preferred embodiment of the present invention.

In addition to finding and ranking best fit of acceleration data, this process will also provide an indication as to which if any of the accelerometers did not function properly as denoted at block 112. The detection of non-functioning or non-optimal accelerometers can be used to activate a flag at block 114 indicating that the road load data should be recollected with accelerometers that function properly.

It is noted that the top six locations and directions from the ranking process of block 110 may not uniquely define the six degrees of freedom of the rigid body as they may not form a linearly independent set of data. Thus, appropriate mathematical tools known to one of ordinary skill in the art can be applied to ensure that the six selections are independent. In addition, the selection process determines the number of degrees of freedom (DOF) from 1 to 6 needed to control the powertrain, and indicates whether the attached or detached mode of operation is selected. This aspect of the present invention is denoted at block 116 which provides for determination of the number of degrees of freedom needed, and block 118 which provides for determination of the mode of operation, i.e., powertrain frame attached or powertrain frame detached. The decision of the number of DOF to use can be made by applying a multiple coherence analysis of an input time history file and determining which DOF do not affect the response. Those DOF not affecting the response can be removed. Alternatively, a drive file can be developed for all 12 DOF inputs to both the chassis table and the engine/powertrain table. Then, cross spectrums of the input and output channels can be compared, and those DOF that do not contribute to producing the desired response can be removed.

At block 120 the ideal accelerations associated with the defined rigid body motion for the best fit locations and directions are then determined. These ideal accelerations are stored as control channel acceleration files.

At block 122, the temperature and thermal cycling data is then used to generate a set of thermal profiles. The generated thermal profiles will be applied as control signals to the heat source 30 during testing of the system 12.

At blocks 124 and 126, the test fixture is positioned in the vehicle coordinate system and the exhaust system attached to test rig 14 in the same manner as an actual vehicle frame. The test rig is arranged to define and support the appropriate powertrain attachment points for the exhaust system in the vehicle coordinate system with a connection system that simulates the exhaust/manifold attachment used in an actual vehicle. With the position of the test fixture defined in the vehicle coordinate system, the coordinates of the control accelerometers are then mapped onto the test fixture frame or rigid body fixture at block 128.

As denoted at block 130, two independent 6-DOF test control models are used to develop the test inputs from the boundary conditions derived from both the control acceleration files (as determined in block 116) and the locations of the accelerometers. One model will control powertrain apparatus motion relative to the test floor, and the other model will control powertrain motion relative to the chassis frame if the powertrain frame attached mode of operation was selected.

For road data collected as in the first embodiment of block 100, both models and both sets of boundary condition data may be used simultaneously to develop the test inputs. For road data collected as in the alternative embodiment of block 100, higher efficiency is attained by first developing the frame control signals without applied powertrain motion. When complete, the control processor determines the powertrain boundary condition error which exists when the frame system is driven, which is then used to develop the correct simulated powertrain test motion. Due to the extreme dynamic nature of some events, however, it may be safer for the test specimen to alternate frame and powertrain iterations or even simultaneously develop the two sets of inputs. However, reducing powertrain boundary condition error using absolute motion will be very slow in this mode, because initial absolute error calculations will be equally dominated by frame motion error and relative powertrain motion error, and cannot be correctly interpreted by the powertrain control model.

Figure 4:
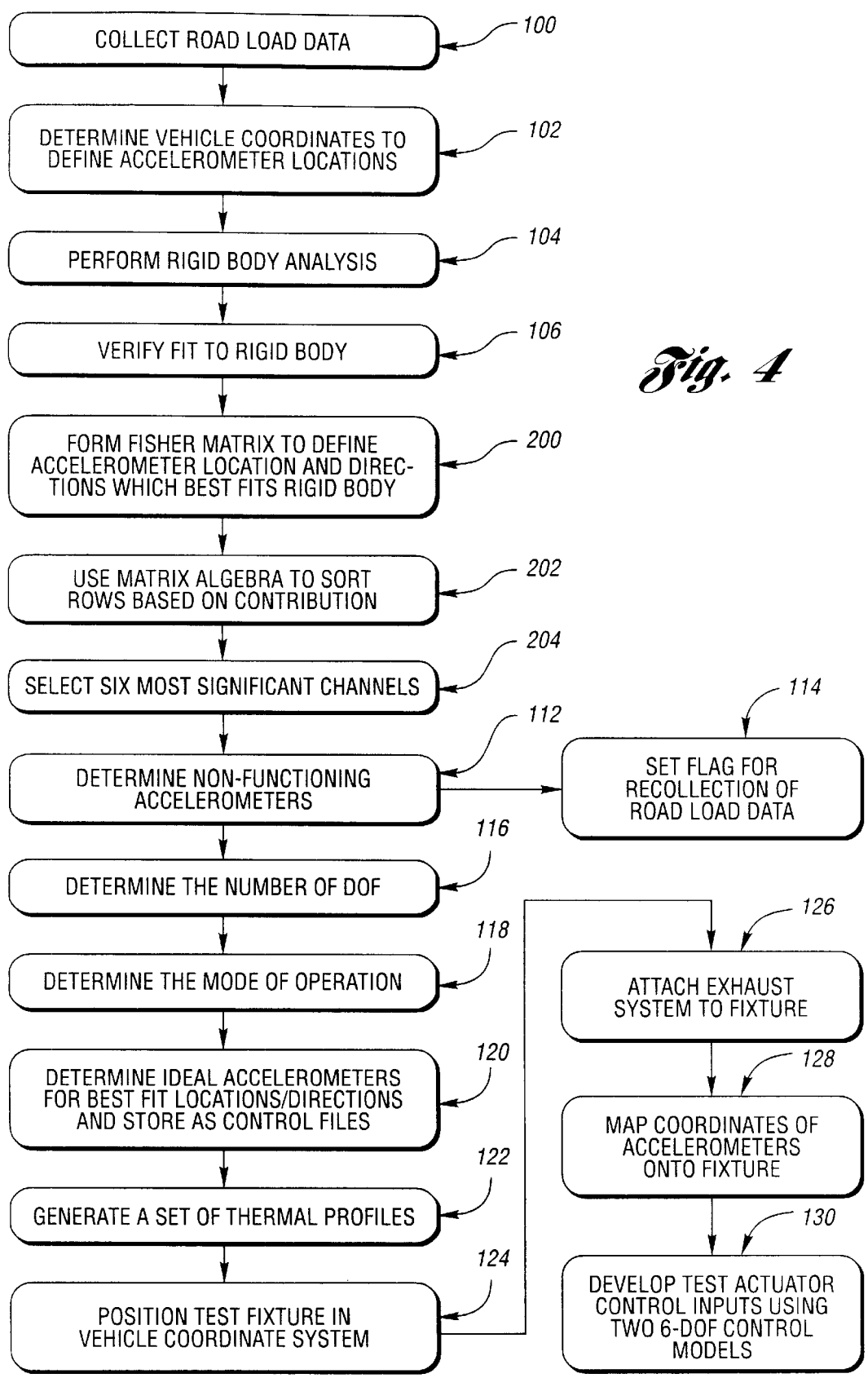
FIG. 4 is a flowchart illustrating the overall process for defining engine and chassis attachment control boundary conditions and appropriate control signals for the test fixture in accordance with a second embodiment of present invention.

An alternative embodiment for blocks 108–114 is shown in FIG. 4, where like blocks of operation have been denoted with like reference numerals. In the embodiment of FIG. 4, acceleration data is selected at block 200 to define the locations and directions that best fit the defined rigid body by forming a "Fisher Information Matrix" representing the system based on the locations and directions of the measurements. Then, at block 202, matrix algebra is used to sort the rows of the matrix based on their respective contribution to the rank of the matrix. In accordance with this embodiment of the present invention, the acceleration data corresponding to higher rows in the matrix are preferred over lower rows. Thereafter, as denoted at block 204 a minimum of the six most significant channels are determined from this process and used as the control channels for the test fixture boundary conditions.

A more detailed explanation will now be made with respect to the rigid body modeling of the present invention in conjunction with FIG. 5. More specifically, a rigid body in space has six degrees of freedom. If more than six independent measurements are made on the body, an estimate can be made of the six degrees of freedom of the rigid body model. The estimated values of the degrees of freedom are then used to predict the measured values. The difference between the actual measurement and the predicted measurement then provides a measure of the validity of the defined rigid body model.

Figure 5:
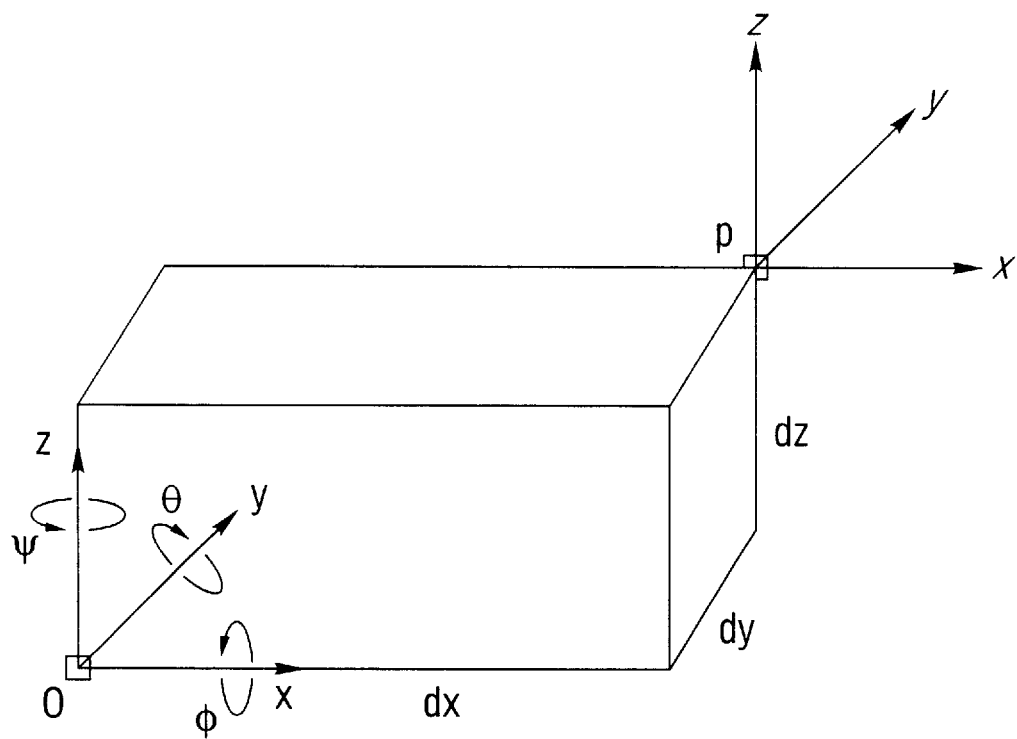
FIG. 5 is a schematic representation of a rigid body.

FIG. 5 shows a schematic of a rigid body. A convenient point 0 on the body is chosen as a reference point. The six degrees of freedom for the body are taken to be the three translations and three rotations of this point. The linear acceleration of point P, fixed on the body, can then be written as:

$$a_p = a_o + a_{p/o}$$
$$= a_o + \dot{\omega} \times d + \omega \times (\omega \times d)$$

where w is the angular velocity of the rigid body and d is the vector from point 0 to point P. The "X" denotes a vector cross product operation. If the third term in the above expression is ignored, the three components of linear acceleration at P become:

$$\dot{x}_p = \dot{x}_0 + d_Z \dot{\omega}_Y - d_Y \dot{\omega}_Z \quad (1)$$
$$\dot{y}_p = \dot{y}_0 + d_Z \dot{\omega}_X - d_X \dot{\omega}_Z \quad (2)$$
$$\dot{z}_p = \dot{z}_0 + d_Y \dot{\omega}_X - d_X \dot{\omega}_Y \quad (3)$$

The neglected terms correspond to centripetal acceleration, and are small compared to total linear acceleration (of the order of $\frac{1}{1000}$) for typical test conditions.

Each measurement can now be written using one of the equations (1)–(3). Each of these equations is linear with respect to the degrees of freedom, $X_0, Y_0, Z_0, \omega_x, \omega_y, \omega_z$. All these equations can be collected together and be written as:

$$(r) = [A]\{q\}$$

where (r) is an n×1 vector of acceleration measurements, [A] is a n×6 matrix of coefficients, and {q} is a 6×1 vector of the rigid body degrees of freedom, $(X_0, Y_0, Z_0, \omega_x, \omega_y, \omega_z)^\tau$.

If there are six independent measurements (i.e., n=6), matrix [A] will be a non-singular square matrix for which {q} can be solved. If the body is not very rigid, {q} will still exist but may not contain any physical meaning.

If there are more than six independent measurements (i.e., n>6), an over-determined linear system will exist. This can be solved in a least square sense as:

$$\{q\} = [[A]^\tau[A]]^{-1}[A]^\tau\{r\}.$$

This is also the formulation for a linear regression problem. If the body is assumed to be rigid, the measurements can be expected to be:

$$\{r'\} = [A]\{q\}.$$

Now, if the body is truly rigid, {r'} will be identical to {r}. The closeness between {r} and {r'} is a measure of the validity of the rigid body assumption. This measure may be the $R^2$ value of the linear regression, defined below:

$$R^2 = (SST - SSE)/SST$$

where $$SST = \Sigma(r_i - r^*)^2$$

and $$SSE = \Sigma(r_i - r_i')^2,$$

where $r^*$ is the mean of $r_i$. When $R^2$ is 1, a perfect fit exists and hence a perfectly rigid body.

Thus, the present invention provides an exhaust system test fixture capable of 12 DOF to operate in conjunction with a method and system capable of generating accurate engine attachment control boundary conditions and corresponding control signals. The test fixture can accurately reproduce both the dynamic behavior of a vehicle engine/powertrain during operation, and the dynamic behavior of the vehicle frame during operation in the area where the exhaust system is attached to the vehicle frame.

Figure 6:
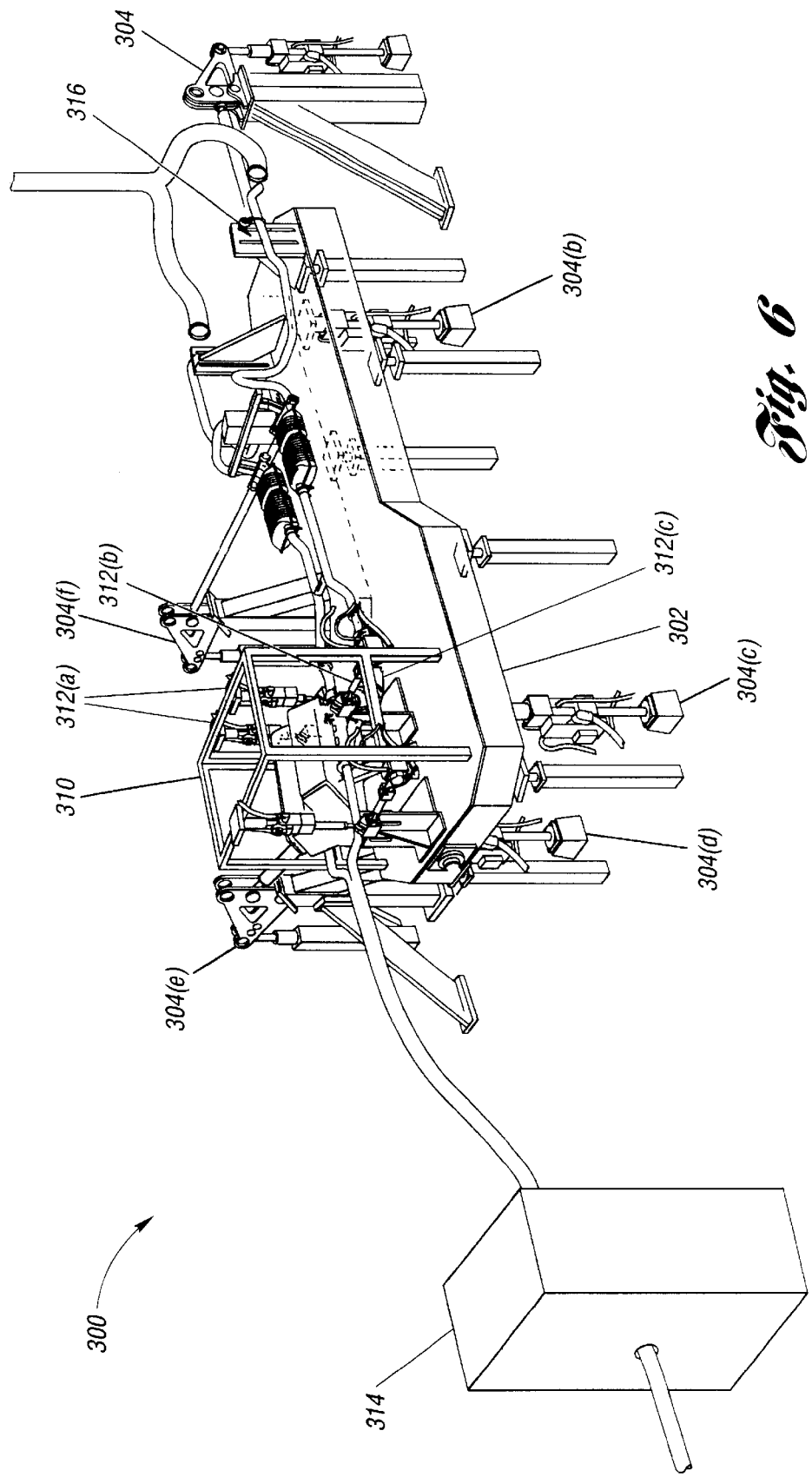
FIG. 6 is an elevated perspective view of a single table 12 DOF exhaust system laboratory test fixture arrangement in accordance with a second embodiment of the present invention.

In accordance with a second embodiment, a test fixture arrangement provides up to 12 DOF using a single test table. An example of such a test fixture arrangement is shown in FIG. 6. More specifically, a single table test rig arrangement 300 includes a rigid body table 302 having up to six DOF motion of road load input. Table 302 supports both the engine and exhaust system within the test rig. A set of hydraulic actuators 304 are coupled to table 302 at various points to produce the six DOF. This set includes an actuator 304(a) connected to provide a longitudinal input to a hanger and bell crank to produce mechanical advantage, motion restriction, and change in loading direction for the longitudinal input. Actuators 304(b), 304(c), and 304(d) are connected to provide rigid body table control of vertical, pitch, and roll motions. Actuators 304(e) and 304(f) are connected to provide rigid body table control of lateral and yaw motions.

A structural support fixture assembly 310 is positioned on table 302 and arranged to be connected to a set of support hydraulic actuators 312 for up to six DOF input of engine motion. Fixture assembly 310 supports up to six hydraulic actuators. A set of three vertical hydraulic actuators 312(a) are attached to the upper fixture frame (such as with a trunnion attachment as shown in FIG. 6) to provide control of vertical, pitch, and roll motion. A set of two lateral hydraulic actuators 312(b) (only one is shown) are attached to the side rail of fixture frame to provide control of lateral and yaw motions. Finally, a longitudinal hydraulic actuator 312(c) is attached to the rear or front of the fixture frame to provide control of longitudinal motion.

A heat source 314 is connected to the engine's exhaust manifold(s) to provide a thermal input to exhaust. A fixture 316 is provided to support a tailpipe hanger bracket assembly.

Operation of test fixture arrangement 300 is similar to that described above in connection with test fixture 10.

In accordance with a third embodiment of the present invention, additional DOF in excess of 12 can be provided as follows.

More specifically, in situations where vehicle body (chassis frame or unibody) dynamics do not behave as a rigid body, additional DOF are provided by directly coupling high frequency displacement devices, such as hydraulic actuators, to the exhaust system hanger attachment points. The engine control strategy does not differ for rigid or non-rigid body dynamics. The number of actuators coupled to a hanger is determined based on the number of hangers and the number of DOF motion required to reproduce the non-linear motion of the body. For example, if the exhaust system is described by a three hanger system requiring three translation axes at each hanger, the DOF needed would be: 9 DOF (Chassis)+6 DOF (Engine)=15 DOF.

An example of such a test fixture arrangement is shown in FIG. 7. In this embodiment, the number of DOF is a function of the number of exhaust system hanger brackets.

As shown, a flexible body direct attachment test rig 400 includes a rigid body table 402 arranged in a manner similar to table 15(a) in FIG. 1 to support the engine and provide up to six DOF. A set of hydraulic actuators 404 are coupled to table 402 at various points to produce the six DOF. This set includes an actuator 404(a) connected to provide a longitudinal input to a hanger and bell crank to produce mechanical advantage, motion restriction, and change in loading direction for the longitudinal input. Actuators 404(b), 404(c), and 404(d) provide vertical, roll, and pitch loading inputs to rigid table 402. Actuators 404(e) and 344(f) are connected to provide rigid body table control of lateral and yaw motions. A heat source 406 provides a thermal input to the exhaust system.

A lower mechanical structure 408 is positioned on table 402 and is arranged to support attachment of an electrodynamic shaker active end and exhaust component(s). This allows simulation of high frequency vibration of engine due to inherent engine unbalance. An upper mechanical structure 410 is positioned on table 402 and is arranged to support a reaction end of the electrodynamic shaker to the rigid body table.

A support fixture arrangement 412 provides direct connection to various exhaust system body side hanger-to-body/frame attachment points. Each connection point supports attachment a hydraulic actuator end. For each exhaust system hanger attachment point, an arrangement of hydraulic actuators 414 are provided along principle axes of vehicle motion as described by longitudinal (x), lateral (y), and vertical (z) coordinates. Vehicle motion of an exhaust system body side hanger is reproduced via road load input in cases where frame/body does not behave has a rigid body. As shown, an actuator 414(a) is connected to provide a longitudinal input to a hanger and bell crank to produce mechanical advantage, motion restriction, and change in loading direction for the longitudinal input. Actuators 414(b) and 404(c) are connected to provide a lateral input to a hanger and bell crank to produce mechanical advantage, motion restriction, and change in loading direction for the lateral input. Actuators 414(d), 414(e), 414(f), and 414(g) are connected to provide a vertical input to a hanger to produce a vertical loading input.

Selecting the number of degrees of freedom for each hanger is based on rigid body analysis using software methods described above. When a correlation coefficient ($r_{SQ(adj)}$) is below a specified critical value, rigid body assumptions would be invalid. As a consequence, an alternative method of exhaust system hanger motion control is necessary to account for nonlinear flexible body motion. Additional analysis is performed that identifies which significant degree of freedom is needed to reproduce the desired motion. This additional analysis can be performed using rigid body methods described above, and/or other vehicle simulation programs.

The present invention utilizes direct attachment of frequency displacement stroke devices to body side exhaust hangers via a test fixture device designed specific to each hanger design. The alignment of the displacement actuators is along the principle axes of vehicle coordinate system. Control signal input to displace the actuators can be received directly from edited road load data, or from a suitable vehicle level modeling program capable of providing signals indicative of real time motion that is representative of the flexible vehicle body.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. An exhaust system test fixture capable of twelve degrees of freedom comprising:
   a first test fixture table arranged to mechanically support a vehicle engine and powertrain simulation apparatus;
   a first set of actuators arranged to control motion of the first test fixture table in six degrees of freedom;
   a second test fixture table arranged to mechanically support a vehicle exhaust system while connected to the engine and powertrain simulation apparatus supported on the first test fixture table;
   a second set of actuators arranged to control motion of the second test fixture table in six degrees of freedom; and
   a controller connected to the first and second set of actuators for generating actuator control signals to control movement of both test fixture tables based on determined boundary conditions.

2. The test fixture of claim 1 wherein both sets of actuators each comprise six actuators.

3. The test fixture of claim 1 wherein the second set of actuators comprises three actuators linked to the second table to control motion in a vertical direction, two actuators linked to the an exhaust system while mounted on the second table to control motion in a lateral direction, and one actuator linked to the second table to control motion in a longitudinal direction.

4. The test fixture of claim 1 further comprising a heat generating device connected to an exhaust system while mounted on the fixture, wherein the controller is further arranged to generate at least one thermal profile to control the heat generating device to heat the exhaust system attached to the test fixture based on the generated thermal profile.

5. The test fixture of claim 1 wherein the controller is further arranged to determine based on a rigid body analysis whether to operate the test fixture so as to simulate the effect of a vehicle powertrain being attached to the vehicle chassis, and determine the actuator control signals based on the determined boundary conditions in combination with a control model arranged to control powertrain motion relative to the vehicle chassis.

6. The test fixture of claim 1 wherein the controller comprises:
   a data collection subsystem arranged to collect actual acceleration road load data for both a vehicle frame at each of the locations where the exhaust system attaches to the vehicle frame, and relative displacement or acceleration data for a vehicle powertrain relative to the vehicle frame;
   control processor connected to the set of accelerometers and responsive to the collected data to obtain vehicle coordinates for a set of locations for the test fixture accelerometers by identifying the vehicle coordinates that define the locations and directions on the vehicle frame at which the actual acceleration road load data was collected, the control processor being further arranged to perform a rigid body analysis by applying the actual acceleration road load data and the identified vehicle coordinates in a statistical multiple linear regression analysis to define a rigid body that fits the road load acceleration data at the vehicle coordinates, determine boundary conditions on the test fixture by selecting a set of accelerometer locations and directions which best fit the defined rigid body, and determine the actuator control signals based on the determined boundary conditions in combination with a first control model arranged to control frame motion relative to a test floor.

7. The test fixture of claim 1 further comprising a vibration source coupled to the exhaust system supported by the first table, wherein the controller is further arranged to generate control signals for the vibration source to simulate engine vibrations.

8. The test fixture of claim 1 wherein the engine and powertrain simulation apparatus comprises a rigid mass mounted to the first table, said rigid mass having geometry coordinates arranged to support mounting and proper positioning of at least one exhaust manifold of the attached exhaust system.

9. The test fixture of claim 8 wherein the at least one exhaust manifold is insulated from the rigid mass to minimize thermal inertia.

10. The test fixture of claim 1 wherein the first set of actuators comprise six actuators linked to the engine and powertrain simulation apparatus when the apparatus is mounted on the first table, and the controller is further arranged to generate control signals for the first set of actuators in accordance with an active engine motion control strategy that excludes any engine mounts.

11. The test fixture of claim 1 wherein the first set of actuators comprise six actuators linked to the first table when the engine and powertrain simulation apparatus is mounted on the first table, and the controller is further arranged to generate control signals for the first set of actuators in accordance with a passive engine control motion strategy that includes any engine mounts.

12. An exhaust system test fixture capable of at least twelve degrees of freedom comprising:
   a test fixture table arranged to mechanically support a vehicle engine and powertrain simulation apparatus;
   a first set of actuators arranged to control motion of the test fixture table in six degrees of freedom;
   a support fixture directly connected to one of the engine and exhaust system;
   a second set of actuators connected to the support fixture to control motion in at least six degrees of freedom; and
   a controller connected to the first and second set of actuators for generating actuator control signals to control movement of the test fixture table and support fixture based on determined boundary conditions.

13. The test fixture of claim 12 wherein the support fixture is connected to the engine, and comprises a frame positioned on top of the test fixture table and connected to the engine via the second set of actuators.

14. The test fixture of claim 13 wherein the second set of actuators comprise:
   a set of hydraulic actuators attached to an upper rail of the frame to provide control of vertical, pitch, and roll motion;

a set of hydraulic actuators attached to a side rail of the frame to provide control of lateral and yaw motions; and a hydraulic actuator attached to the frame to provide control of longitudinal motion.

15. The test fixture of claim 12 wherein the support fixture is connected to the exhaust system at each hanger point and is arranged to connect the second set of actuators to the exhaust system at the hanger points.

16. The test fixture of claim 15 wherein for each exhaust system hanger attachment point, the support fixture is arranged to couple the second set of actuators along principle axes of vehicle motion so as to control longitudinal, lateral, and vertical motion.

17. The test fixture of claim 12 further comprising a heat generating device connected to the exhaust system while mounted on the fixture, wherein the controller is further arranged to generate at least one thermal profile to control the heat generating device to heat the exhaust system attached to the test fixture based on the generated thermal profile.

18. The test fixture of claim 12 wherein the first set of actuators comprises three actuators linked to the test table to control motion in a vertical direction, two actuators linked to the an exhaust system while mounted on the second table to control motion in a lateral direction, and one actuator linked to the second table to control motion in a longitudinal direction.

* * * * *